United States Patent
Anderson et al.

(10) Patent No.: US 10,649,305 B2
(45) Date of Patent: May 12, 2020

(54) COMPLEMENTARY OPTICAL PHASE SHIFTING ARRANGEMENT

(71) Applicant: Cisco Technology, Inc., San Jose, CA (US)

(72) Inventors: Sean P. Anderson, Macungie, PA (US); Vipulkumar Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/872,176

(22) Filed: Jan. 16, 2018

(65) Prior Publication Data
US 2019/0219890 A1 Jul. 18, 2019

(51) Int. Cl.
G02B 6/26 (2006.01)
G02F 1/313 (2006.01)
G02F 1/01 (2006.01)
G02F 1/025 (2006.01)
G02F 1/225 (2006.01)

(52) U.S. Cl.
CPC .......... *G02F 1/3136* (2013.01); *G02F 1/0121* (2013.01); *G02F 1/0147* (2013.01); *G02F 1/025* (2013.01); *G02F 1/225* (2013.01); *G02F 2202/10* (2013.01); *G02F 2203/15* (2013.01); *G02F 2203/50* (2013.01)

(58) Field of Classification Search
USPC ...................................... 385/9, 39
See application file for complete search history.

(56) References Cited

U.S. PATENT DOCUMENTS

| 4,392,079 A * | 7/1983 | Pasmannik ............. H01J 25/10 315/5.39 |
| 5,866,897 A * | 2/1999 | Nishizawa ............ G04F 13/026 250/214 VT |
| 5,896,053 A * | 4/1999 | Prentice .................. H03K 5/151 327/175 |
| 2003/0058504 A1 | 3/2003 | Cho et al. |
| 2003/0169964 A1 | 9/2003 | Wang et al. |
| 2005/0185970 A1* | 8/2005 | Madsen ................ G02F 1/0136 398/202 |

(Continued)

FOREIGN PATENT DOCUMENTS

| EP | 0572960 A1 | 12/1993 |
| WO | 2014187374 A1 | 11/2014 |

OTHER PUBLICATIONS

Bergman et. al., "Optical Switching Performance Metrics for Scalable Data Centers," OECC/PS2016, 3 pages.

(Continued)

*Primary Examiner* — Eric Wong
(74) *Attorney, Agent, or Firm* — Patterson + Sheridan, LLP (57) ABSTRACT

An optical phase shifting arrangement and associated optical switching device and method are disclosed. The optical phase shifting arrangement comprises a first optical phase shifter configured to provide a first phase shift to an optical signal, and a second optical phase shifter configured to provide a second phase shift to the optical signal in addition to the first phase shift. During a predefined period, the first optical phase shifter and the second optical phase shifter are driven such that the second phase shift is substantially complementary to the first phase shift.

20 Claims, 7 Drawing Sheets

(56) References Cited

U.S. PATENT DOCUMENTS

| | | | | |
|---|---|---|---|---|
| 2007/0110450 A1* | 5/2007 | Bogoni | ................ | H04B 10/299 |
| | | | | 398/152 |
| 2010/0060970 A1* | 3/2010 | Chen | ....................... | G02F 1/025 |
| | | | | 359/245 |
| 2016/0013868 A1* | 1/2016 | Anderson | ............. | G02F 1/0147 |
| | | | | 359/246 |
| 2017/0099529 A1 | 4/2017 | Dupuis et al. | | |
| 2017/0315424 A1 | 11/2017 | Celo et al. | | |

OTHER PUBLICATIONS

Wen et al., "Flexfly: Enabling a Reconfigurable Dragonfly Through Silicon Photonics," IEEE, Nov. 2016, 12 pages.

Cheng et al., "Advanced Path Mapping for Silicon Photonic Swtich Fabrics," CLEO 2017, 2 pages.

PCT Notification of Transmittal of The International Search Report and The Written Opinion of the International Searching Authority, or Declaratoin for Applicaton No. PCT/US2019/013527 dated Apr. 8, 2019.

* cited by examiner

COMPLEMENTARY OPTICAL PHASE SHIFTING ARRANGEMENT

TECHNICAL FIELD

Embodiments presented in this disclosure generally relate to optical networking, and more specifically, to a complementary optical phase shifting arrangement suitable for use in optical networking.

BACKGROUND

Optical switching devices, such as optical cross-connects, are widely used to create switch fabrics and dynamically configurable optical networks. To minimize link downtime and to enable continuous link reconfiguration, the optical switching devices may require switching speeds of about 100 nanoseconds (ns) or less. Additionally, low optical loss of the optical switching devices in an on-state and high extinction in an off-state may be beneficial to reduce an impairment to the link budget.

Various implementations may seek to strike a balance between switching speed and insertion loss for the optical switching devices. However, low-loss optical switching devices typically have switching latencies on the order of 100 microseconds (μs), and high-speed optical switching devices typically have several decibels (dB) of insertion loss. Integrated optical gain components may be used to compensate for the insertion loss, which can add to the cost and power consumption of the optical switching devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an optical phase shifting arrangement comprising a first optical phase shifter configured to provide a first phase shift to an optical signal, and a second optical phase shifter configured to provide a second phase shift to the optical signal in addition to the first phase shift. During a predefined period, the first optical phase shifter and the second optical phase shifter are driven such that the second phase shift is substantially complementary to the first phase shift.

Another embodiment presented in this disclosure is an optical switching device comprising a first arm configured to propagate a first optical signal, a second arm configured to propagate a second optical signal, and a first optical phase shifter arranged proximate to the first arm. The first optical phase shifter configured to provide a first phase shift to the first optical signal. The optical switching device further comprises a second optical phase shifter arranged proximate to the first arm, the second optical phase shifter configured to provide a second phase shift to the first optical signal in addition to the first phase shift. During a switching period, the first optical phase shifter and the second optical phase shifter are driven such that the second phase shift is substantially complementary to the first phase shift.

Another embodiment presented in this disclosure is a method comprising providing, using a first optical phase shifter, a first phase shift to a first optical signal propagating along a first arm. The method further comprises during a predefined period, driving a second optical phase shifter to provide a second phase shift to the first optical signal in addition to the first phase shift. The second phase shift is substantially complementary to the first phase shift.

Example Embodiments

According to various embodiments discussed herein, a complementary optical phase shifting arrangement comprises a first optical phase shifter configured to provide a first phase shift to an optical signal, and a second optical phase shifter configured to provide a second phase shift to the optical signal in addition to the first phase shift. During a predefined period, the first optical phase shifter and the second optical phase shifter are driven such that the second phase shift is substantially complementary to the first phase shift. In some embodiments, the first optical phase shifter comprises a thermo-optic (TO) phase shifter, and the second optical phase shifter comprises one of an electro-optic (EO) phase shifter or an optically-pumped phase shifter.

Beneficially, the relatively low steady-state insertion loss of the first optical phase shifter may be combined with the relatively high switching speeds of the second optical phase shifter. For example, switching times of 10 ns or less may be achieved with a low insertion loss of about 0.2-0.5 dB per optical switching element and with a low power consumption during steady-state operation. Further, the embodiments disclosed herein may be compatible with existing components and processes, as well as with existing optical switching device architectures and control algorithms, reducing a complexity and cost of implementation.

Figure 1:
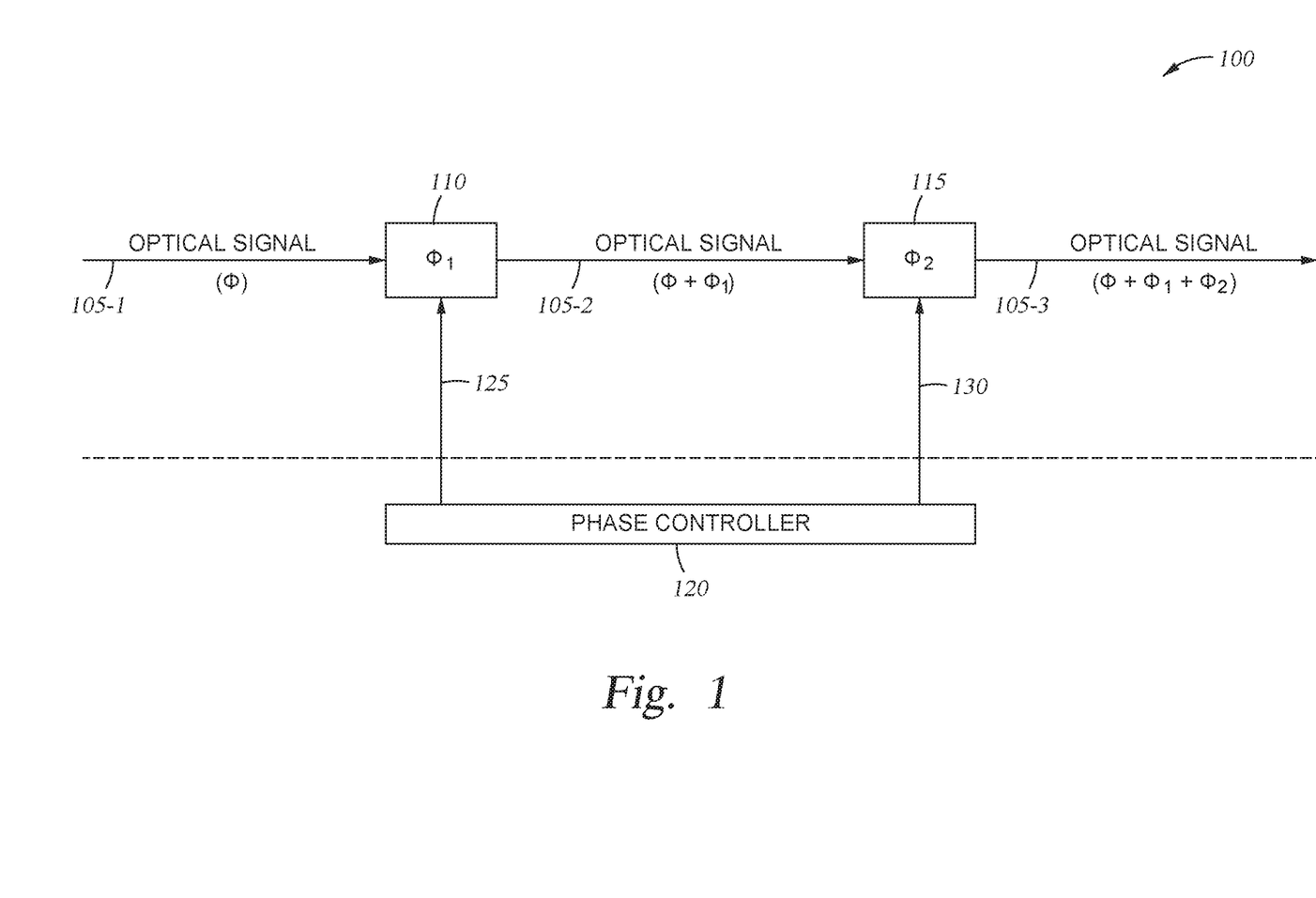
FIG. 1 illustrates an exemplary optical phase shifting arrangement, according to one or more embodiments.

FIG. 1 illustrates an exemplary optical phase shifting arrangement 100, according to one or more embodiments. The optical phase shifting arrangement 100 comprises a first optical phase shifter 110 configured to provide a first phase shift $\phi_1$ to a received optical signal 105-1. Although not shown, the optical signal 105-1 may be carried by any suitable means. For example, the optical phase shifting arrangement 100 may comprise an optical waveguide or an optical fiber. In some embodiments, components of the optical phase shifting arrangement 100 are implemented in a silicon-insulator-silicon capacitive (SISCAP) structure.

Assuming that the optical signal 105-1 has a phase $\phi$, the optical signal 105-2 that is output from the first optical phase shifter 110 has a phase $(\phi+\phi_1)$. The optical phase shifting arrangement 100 further comprises a second optical phase shifter 115 that is configured to provide a second phase shift $\phi_2$ to the received optical signal 105-2. The optical signal 105-3 output from the second optical phase shifter 115 has a phase $(\phi+\phi_1+\phi_2)$. In this way, the optical phase shifting arrangement 100 is configured to provide a total phase shift $(\phi_1+\phi_2)$ to the received optical signal 105-1.

The optical phase shifting arrangement 100 is communicatively coupled with a phase controller 120. The phase controller 120 may comprise a processor and a memory. The phase controller 120 is configured to transmit control signal (s) 125 to the first optical phase shifter 110, and to transmit control signal(s) 130 to the second optical phase shifter 115. In some cases where the optical phase shifting arrangement 100 is included in an optical switching device, the phase controller 120 may receive switch state information for the optical switching device.

During a predefined period, the first optical phase shifter 110 and the second optical phase shifter 115 are driven by the phase controller 120 such that the second phase shift $\phi_2$ is complementary to the first phase shift $\phi_1$. As discussed herein, "complementary" indicates that the first phase shift $\phi_1$ and the second phase shift $\phi_2$ are controlled with a predefined relationship such that the total phase shift $(\phi_1+\phi_2)$ has a predefined value or a predefined trend during the predefined period. In one non-limiting example, the first phase shift $\phi_1$ has an increasing trend with an exponential decay during the predefined period, and the second phase shift $\phi_2$ has a decreasing trend with an exponential decay. In some embodiments, the total phase shift $(\phi_1+\phi_2)$ is a substantially constant value during the predefined period. In other embodiments, the total phase shift $(\phi_1+\phi_2)$ has a predefined trend during the predefined period.

In some embodiments, the predefined period corresponds to a predefined switching period for the optical phase shifting arrangement 100. In some cases where the optical phase shifting arrangement 100 is included in an optical switching device, the predefined period corresponds to a predefined switching period for the optical switching device.

In some embodiments, the first optical phase shifter 110 has a first rise time for the first phase shift $\phi_1$ to reach a predefined phase shift value. A slower rise time generally corresponds to a slower switching speed of the optical phase shifting arrangement 100. The second optical phase shifter 115 may have a second rise time that is substantially less than the first rise time. For example, a TO implementation of the first optical phase shifter 110 may have a first rise time on the order of 10-100 microseconds (µs), while an EO implementation of the second optical phase shifter 115 may have a rise time on the order of 10-100 ns. In this way, the second optical phase shifter 115 may be driven by the phase controller 120 to compensate for the relatively slow second rise time of the first optical phase shifter 110. Other implementations of the first optical phase shifter 110 and/or the second optical phase shifter 115 having different rise times are also possible.

Figure 2:
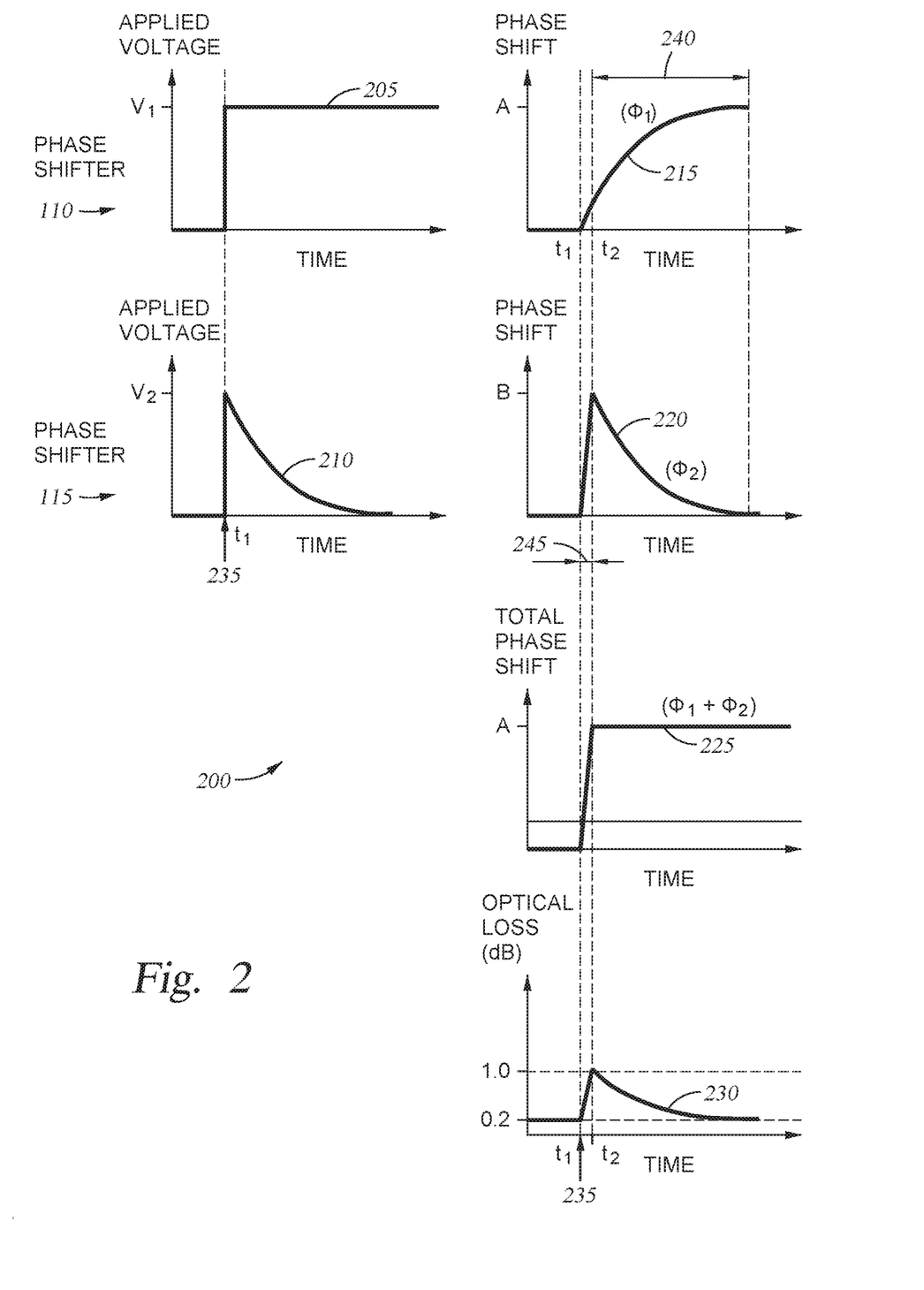
FIG. 2 is a diagram illustrating an exemplary scheme for driving a complementary optical phase shifting arrangement, according to one or more embodiments.

FIG. 2 is a diagram 200 illustrating an exemplary scheme for driving a complementary optical phase shifting arrangement, according to one or more embodiments. The features illustrated in the diagram 200 may be used in conjunction with other embodiments, such as the optical phase shifting arrangement 100 and the phase controller 120 of FIG. 1. For example, the first optical phase shifter 110 may be a TO phase shifter, and the second optical phase shifter 115 may be an EO phase shifter.

The first optical phase shifter 110 is driven with a square edge signal 205 transitioning at time $t_1$ from an applied voltage of zero to an applied voltage of $V_1$. Responsive to the square edge signal 205, the first phase shift 215 provided by the first phase shifter 110 (corresponding to the phase shift $\phi_1$) begins increasing from zero at time $t_1$ to a predefined phase shift value A at time $t_3$. In a TO implementation of the first optical phase shifter 110, the rise time 240 between time $t_1$ and time $t_3$ may be in the range of 10-100 µs. In some embodiments, a predefined switching event 235 is signaled by the phase controller 120 to begin at the time $t_1$. The predefined switching event 235 may correspond to changing switch states of an associated optical switching device.

The second optical phase shifter 115 is driven with an impulse signal 210, transitioning at the time $t_1$ from an applied voltage of zero to an applied voltage of $V_2$, then decaying to a zero voltage over time. Responsive to the impulse signal 210, the second phase shift 220 provided by the second phase shifter 115 (corresponding to the phase shift $\phi_2$) begins increasing from a zero value at time $t_1$ to a predefined phase shift value B at time $t_2$, then decays to zero over time. In an EO implementation of the second optical phase shifter 115, the rise time 245 between time $t_1$ and $t_2$ may be in the range of 10-100 ns. In some embodiments, the decay of the impulse signal 210 is selected to compensate the rise time 240 associated with the first phase shift 215.

As shown, a total phase shift 225 provided using the combination of the first optical phase shifter 110 and the second optical phase shifter 115 (corresponding to the total phase shift $\phi_1+\phi_2$) begins increasing from a zero value at time $t_1$ to the predefined phase shift value A at time $t_2$. In some embodiments, the predefined phase shift value A is maintained beyond the time $t_2$, e.g., until a next predefined switching event. In some embodiments, the predefined phase shift value A corresponds to a pi ($\pi$; 180°) phase shift. However, other phase shift values are also possible.

The waveforms used for driving the first optical phase shifter 110 and/or the second optical phase shifter 115 may be different than the combination of the square edge signal 205 and the impulse signal 210, depending on the properties of the first optical phase shifter 110 and the second optical phase shifter 115 and/or the amounts of the phase shifts $\phi_1$, $\phi_2$. Further, the applied voltages $V_1$, $V_2$ may be the same or may be different, depending on the properties of the first optical phase shifter 110 and the second optical phase shifter 115 and/or the amounts of the phase shifts $\phi_1$, $\phi_2$. Still further, the predefined phase shift values A, B may be the same or may be different. For example, if the optical phase shifting arrangement 100 is configured to provide the total phase shift 225 of A, the phase shift value B provided by the second optical phase shifter 115 may be less than the phase shift value A provided by the first optical phase shifter 110 to account for the rise of the first phase shift 215 between time $t_1$ and time $t_2$.

An optical loss 230 associated with the optical phase shifting arrangement 100 increases from about 0.2 dB at time $t_1$ to about 1.0 dB at time $t_2$, primarily due to driving the second optical phase shifter 115. As the first optical phase shifter 110 settles and the second phase shift 220 decays to a zero value, the optical loss 230 decays to about 0.2 dB within about 100 µs.

Stated another way, in some implementations of the optical phase shifting arrangement 100 comprising a TO phase shifter and an EO phase shifter configured to have their optical phases add, the TO phase shifter and the EO phase shifter may each be activated during the predefined switching event 235. The applied voltage $V_1$ that is applied to the TO phase shifter may be set to cause a pi phase shift. The EO phase shifter may be momentarily energized to compensate the relatively slow response time of the TO phase shifter. In this way, the total phase shift provided by the optical phase shifting arrangement 100 may transitions very rapidly (e.g., 10 ns or less) to the pi phase shift value.

The rapid transition to the pi phase shift value may cause the off-state port to reach full extinction very quickly. The on-state port may further transition very quickly to a semi-low loss state (e.g., on the order of 1-2 dB). As the TO phase shifter settles, the EO phase shifter is gradually de-energized, and the on-state optical loss drops below 1 dB in less than 1 millisecond (ms).

In some embodiments, to reduce both power consumption and on-state optical loss of the optical phase shifting arrangement 100, the TO phase shifter is configured to maintain the switch state during steady-state operation (i.e., outside of the predefined switch event 235).

Figure 3:
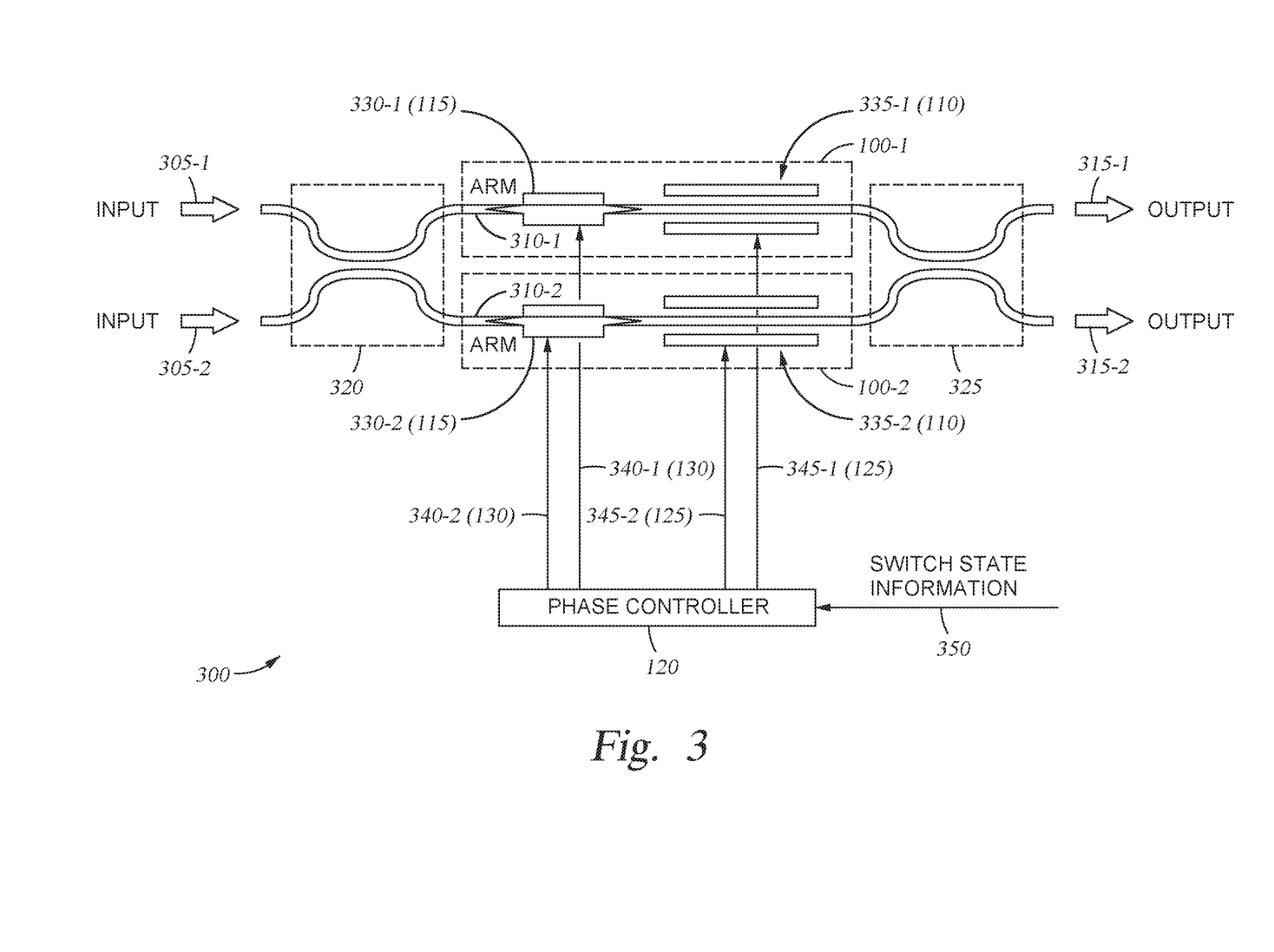
FIG. 3 is a diagram of an exemplary optical switching device having multiple complementary optical phase shifting arrangements, according to one or more embodiments.

FIG. 3 is a diagram 300 of an exemplary optical switching device having multiple complementary optical phase shifting arrangements, according to one or more embodiments. More specifically, the diagram 300 depicts one possible implementation of a 2×2 optical cross-connect. The features depicted in the diagram 300 may be used in conjunction with other embodiments, such as the optical phase shifting arrangement 100 of FIG. 1 and the driving scheme depicted in diagram 200 of FIG. 2.

The optical switching device comprises a first input 305-1 (generically, input 305) configured to receive a first optical signal, and a second input 305-2 configured to receive a second optical signal. The first optical signal and the second optical signal are propagated along respective arms 310-1, 310-2 to a first output 315-1 (generically, output 315) and a second output 315-2.

The optical switching device further comprises an input optical coupler 320 configured to receive a plurality of input optical signals, and to provide a first optical signal to the first arm 310-1 and provide the second optical signal to the second arm 310-2. The input optical coupler 320 is configured to distribute the optical power from the plurality of input optical signals among the first optical signal and the second optical signal.

A first optical phase shifting arrangement 100-1 (i.e., a first implementation of the optical phase shifting arrangement 100) is arranged along the first arm 310-1, and a second optical phase shifting arrangement 100-2 (i.e., a second implementation of the optical phase shifting arrangement 100) is arranged along the second arm 310-2. The first optical phase shifting arrangement 100-1 comprises an EO phase shifter 330-1 (one example of the second optical phase shifter 115) and a TO phase shifter 335-1. The second optical phase shifting arrangement 100-2 comprises an EO phase shifter 330-2 and a TO phase shifter 335-2.

The EO phase shifters 330-1, 330-2 (generically, EO phase shifter 330) and the TO phase shifters 335-1, 335-2 (generically, TO phase shifter 335) may have any suitable implementation. In some embodiments, the EO phase shifter 330 comprises one of a SISCAP modulator, a p-n junction modulator, and a p-i-n junction modulator. In alternate implementations, an optically-pumped phase shifter may be substituted for the EO phase shifter 330.

The optical switching device further comprises an output optical coupler 325 configured to receive phase-controlled optical signals from the first optical phase shifting arrangement 100-1 and the second optical phase shifting arrangement 100-2, and to provide a plurality of output optical signals to the first output 315-1 and the second output 315-2. The output optical coupler 325 is configured to distribute the optical power from the plurality of phase-controlled optical signals to the first output 315-1 and the second output 315-2.

The phase controller 120 is configured to provide control signals 340-1 to the EO phase shifter 330-1, to provide control signals 340-2 to the EO phase shifter 330-2, to provide control signals 345-1 to the TO phase shifter 345-1, and to provide control signals 345-2 to the TO phase shifter 345-2. In some embodiments, the phase controller 120 is configured to provide square edge signals as the control signals 345-1, 345-2, and to provide impulse signals (with decay) as the control signals 340-1, 340-2.

In some embodiments, the phase controller 120 is further configured to receive switch state information 350 that indicates how the input optical signals provided to the first input 305-1 and the second input 305-2 will be routed among the first output 315-1 and the second output 315-2. For example, based on the net optical phase shift resulting from driving the control signals 340-1, 340-2, 345-1, 345-2, the optical switching device may be configured in one of a "through" switch state (where the optical signal received at the first input 305-1 is routed to the first output 315-1, and the optical signal received at the second input 305-2 is routed to the second output 315-2) and a "cross" switch state (where the optical signal received at the first input 305-1 is routed to the second output 315-2, and the optical signal received at the second input 305-2 is routed to the first output 315-1).

The optical switching device depicted in diagram 300 may beneficially combine the relatively low steady-state insertion loss provided by the TO phase shifters 335-1, 335-2 with the relatively high switching speeds provided by the EO phase shifters 330-1, 330-2. In this way, the optical switching device may be configured to have a suitable balance between a desired steady-state power consumption and a desired recovery speed.

In some embodiments, the phase controller 120 may provide the control signals 340-1, 340-2, 345-1, 345-2 in such a manner to balance the optical intensity in each of the arms 310-1, 310-2. For example, the phase controller 120 may apply a different voltage to the EO phase shifter 330-1 than the EO phase shifter 330-2 to introduce a desired loss (e.g., about 1 dB) into the arm 310-1.

Although the diagram 300 illustrates an optical phase shifting arrangement 100-1, 100-2 for each of the arms 310-1, 310-2, alternate implementations may include different numbers of optical phase shifting arrangements 100. For example, one alternate implementation may include the optical phase shifting arrangement 100-1 along arm 310-1 while omitting the optical phase shifting arrangement 100-2 along arm 310-2. Further, while a 2×2 optical cross-connect is depicted in the diagram 300, the principles may be applied to different implementations of optical switching elements (e.g., having alternate numbers of inputs 305 and/or outputs 315).

Figure 4:
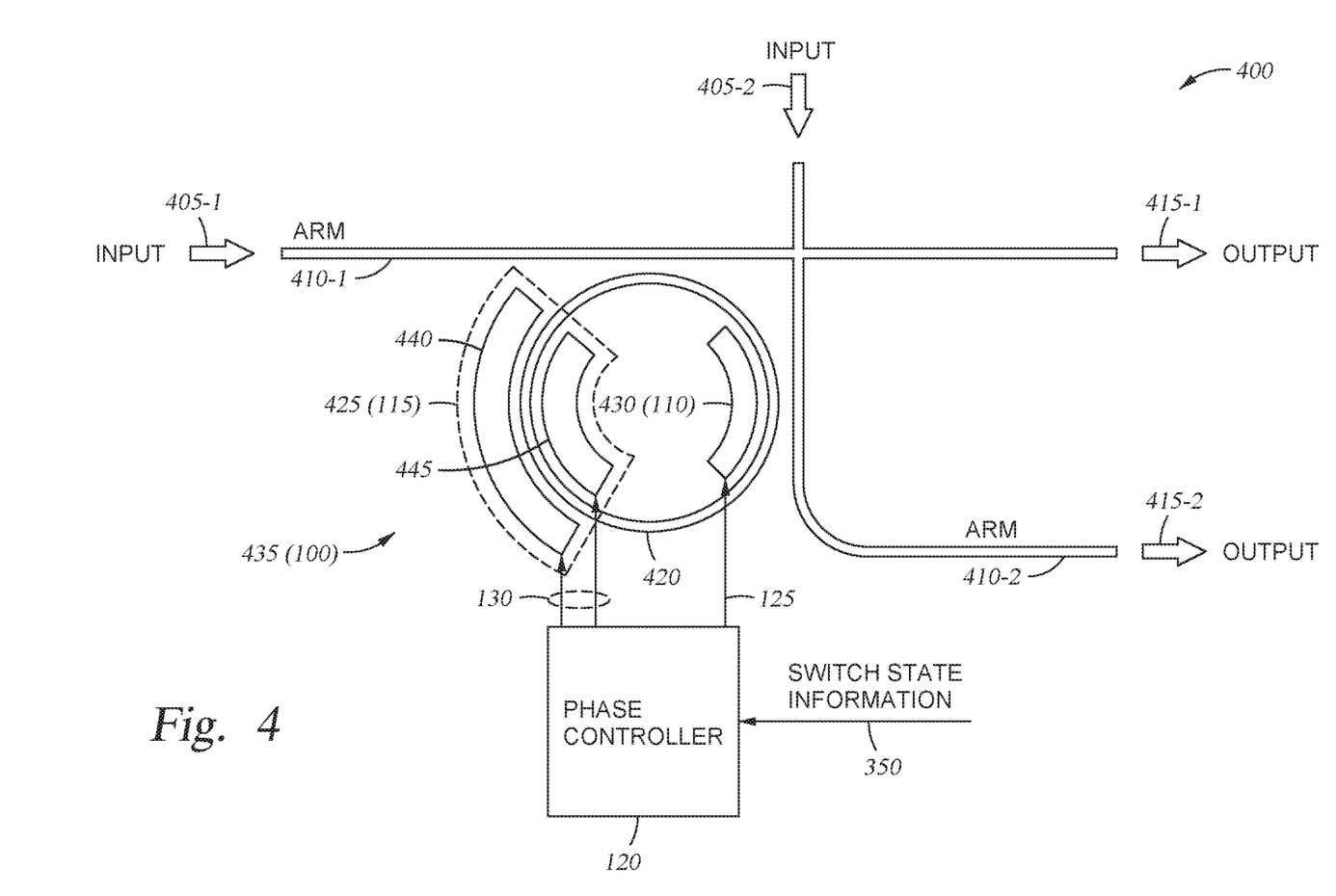
FIG. 4 is a diagram of an exemplary optical switching device having a complementary optical phase shifting arrangement included in a ring modulator, according to one or more embodiments.

FIG. 4 is a diagram 400 of an exemplary optical switching device having a complementary optical phase shifting arrangement included in a ring modulator, according to one or more embodiments. The features depicted in the diagram 400 may be used in conjunction with other embodiments, such as the optical phase shifting arrangement 100 of FIG. 1 and the driving scheme depicted in diagram 200 of FIG. 2.

The optical switching device depicted in the diagram 400 comprises a first input 405-1 (generically, input 405) configured to receive a first optical signal, and a second input 405-2 configured to receive a second optical signal. The first optical signal is configured to propagate along a first arm 410-1 to a first output 415-1 (generically, output 415), and the second optical signal is configured to propagate along a second arm 410-2 to a second output 415-2.

The optical switching device further comprises a ring modulator 435, which provides one example of the optical phase shifting arrangement 100. The ring modulator 435 comprises a waveguide 420 disposed proximate to the first arm 410-1 and/or the second arm 410-2. A TO phase shifter 430 (e.g., one example of the first optical phase shifter 110) and an EO phase shifter 425 (e.g., one example of the second optical phase shifter 115) are each arranged proximate to the waveguide 420. In some embodiments, the TO phase shifter 430 may be disposed away from a coupling region of the ring modulator 435 to mitigate interference of the TO phase shifter 430 with the coupling.

A first portion 440 of the EO phase shifter 425 is disposed outside an area defined by the waveguide 420, and a second portion 445 of the EO phase shifter 425 is disposed within the area. The first portion 440 may represent a first terminal of the EO phase shifter 425 having a first doping, and the second portion 445 may represent a second terminal of the EO phase shifter 425 having a second doping. Based on the control signals 125, 130 provided to the TO phase shifter 430 and the EO phase shifter 425, the ring modulator 435 configured to modulate the first optical signal propagating along the arm 410-1 and/or the second optical signal propagating along the arm 410-2.

The EO phase shifter 425 and the TO phase shifter 430 may have any suitable implementation. In some embodiments, the EO phase shifter 425 comprises one of a SISCAP modulator, a p-n junction modulator, and a p-i-n junction modulator. In alternate implementations, an optically-pumped phase shifter may be substituted for the EO phase shifter 425.

Based on the net optical phase shift resulting from driving the control signals 125, 130, the optical switching device may be configured in one of a "through" switch state (where the first optical signal received at the first input 405-1 is routed to the first output 415-1, and the second optical signal received at the second input 405-2 is routed to the second output 415-2) and a "cross" switch state (where the first optical signal received at the first input 405-1 is routed to the second output 415-2, and the second optical signal received at the second input 405-2 is routed to the first output 415-1).

Although the diagram 400 illustrates a single optical phase shifting arrangement 100 arranged proximate to each of the arms 410-1, 410-2, alternate implementations may include different numbers of optical phase shifting arrangements 100. For example, one alternate implementation may include a first optical phase shifting arrangement 100 along the arm 410-1 and a second optical phase shifting arrangement 100 along the arm 410-2. Further, while the optical switching element is depicted as having two inputs 405-1, 405-2 and two outputs 415-1, 415-2, the principles may be applied to different implementations of optical switching elements (e.g., having alternate numbers of inputs 405 and/or outputs 415).

Figure 5:
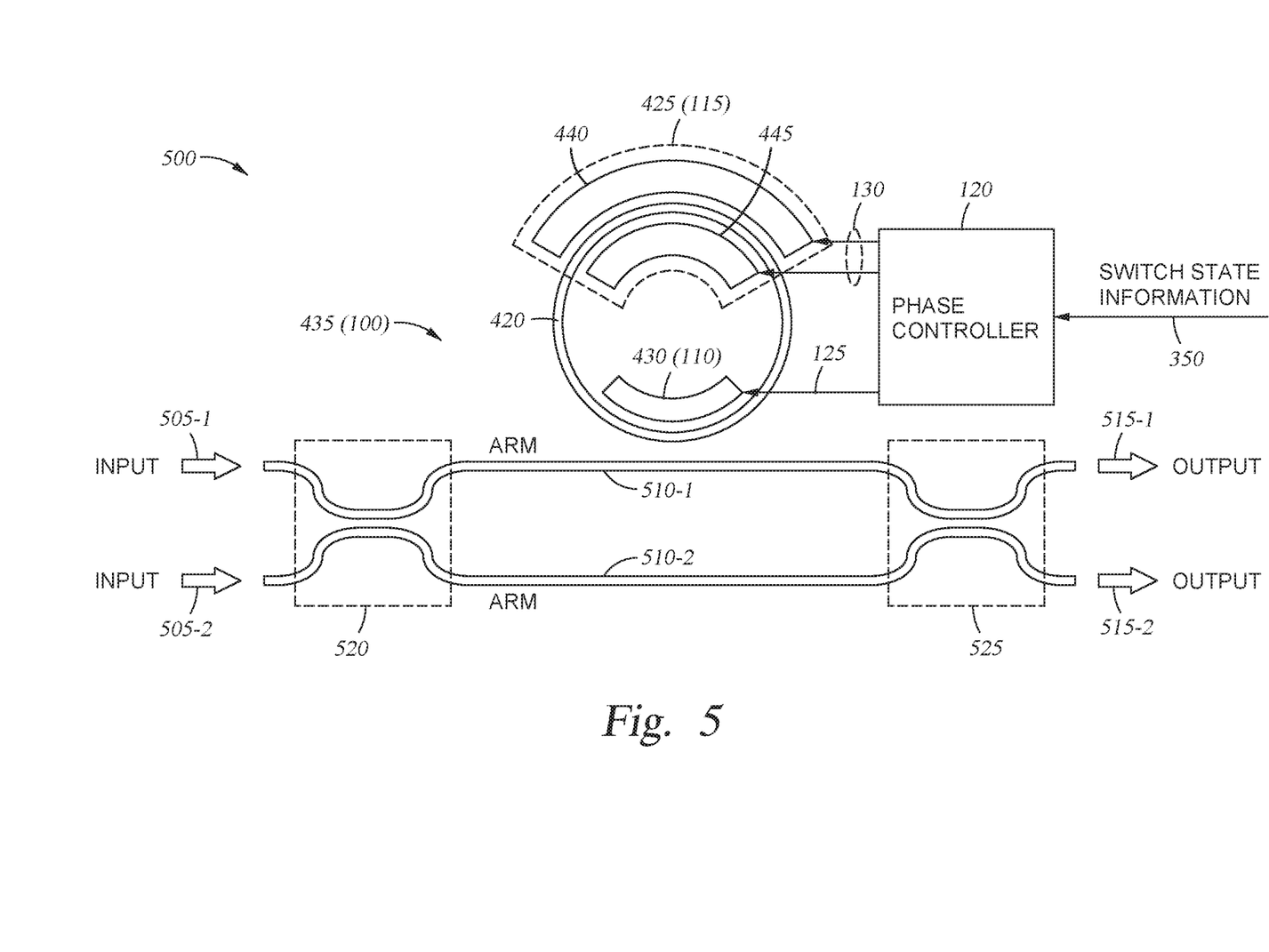
FIG. 5 is a diagram of an exemplary optical switching device having a complementary optical phase shifting arrangement included in a ring modulator, according to one or more embodiments.

FIG. 5 is a diagram 500 of an exemplary optical switching device having a complementary optical phase shifting arrangement included in a ring modulator, according to one or more embodiments. The features depicted in the diagram 400 may be used in conjunction with other embodiments, such as the optical phase shifting arrangement 100 of FIG. 1 and the driving scheme depicted in diagram 200 of FIG. 2.

The optical switching device depicted in the diagram 500 comprises a first input 505-1 (generically, input 505) configured to receive a first optical signal, and a second input 505-2 configured to receive a second optical signal. The first optical signal is configured to propagate along a first arm 510-1 to a first output 515-1 (generically, output 515), and the second optical signal is configured to propagate along a second arm 510-2 to a second output 515-2.

The optical switching device further comprises an input optical coupler 520 configured to receive a plurality of input optical signals, and to provide a first optical signal to the first arm 510-1 and provide the second optical signal to the second arm 510-2. The input optical coupler 520 may be configured similar to the input optical coupler 320 of FIG. 3.

The optical switching device further comprises an output optical coupler 525 configured to receive a phase-controlled optical signal from the first arm 510-1 and a non-phase controlled optical signal from the second arm 510-2, and to provide a plurality of output optical signals to the first output 515-1 and the second output 515-2. The output optical coupler 525 may be configured similar to output optical coupler 325 of FIG. 3.

The optical switching device further comprises a ring modulator 435, which provides one example of the optical phase shifting arrangement 100. The waveguide 420 is disposed proximate to the first arm 510-1. As shown, there is no optical phase shifting arrangement 100 arranged along the second arm 510-2. The TO phase shifter 430 and the EO phase shifter 425 are each arranged proximate to the waveguide 420. Based on the control signals 125, 130 provided to the TO phase shifter 430 and the EO phase shifter 425, the ring modulator 435 configured to modulate the first optical signal propagating along the arm 510-1.

For example, based on the net optical phase shift resulting from driving the control signals 125, 130, the optical switching device may be configured in one of a "through" switch state (where the first optical signal received at the first input 505-1 is routed to the first output 515-1, and the second optical signal received at the second input 505-2 is routed to the second output 515-2) and a "cross" switch state (where the first optical signal received at the first input 505-1 is routed to the second output 515-2, and the second optical signal received at the second input 505-2 is routed to the first output 515-1).

Although the diagram 500 illustrates a single optical phase shifting arrangement 100 arranged proximate to the arm 510-1, alternate implementations may include different numbers of optical phase shifting arrangements 100. For example, one alternate implementation may include a first optical phase shifting arrangement 100 along the arm 510-1 and a second optical phase shifting arrangement 100 along the arm 510-2. Further, while the optical switching element is depicted as having two inputs 505-1, 505-2 and two outputs 515-1, 515-2, the principles may be applied to different implementations of optical switching elements (e.g., having alternate numbers of inputs 505 and/or outputs 515).

Figure 6:
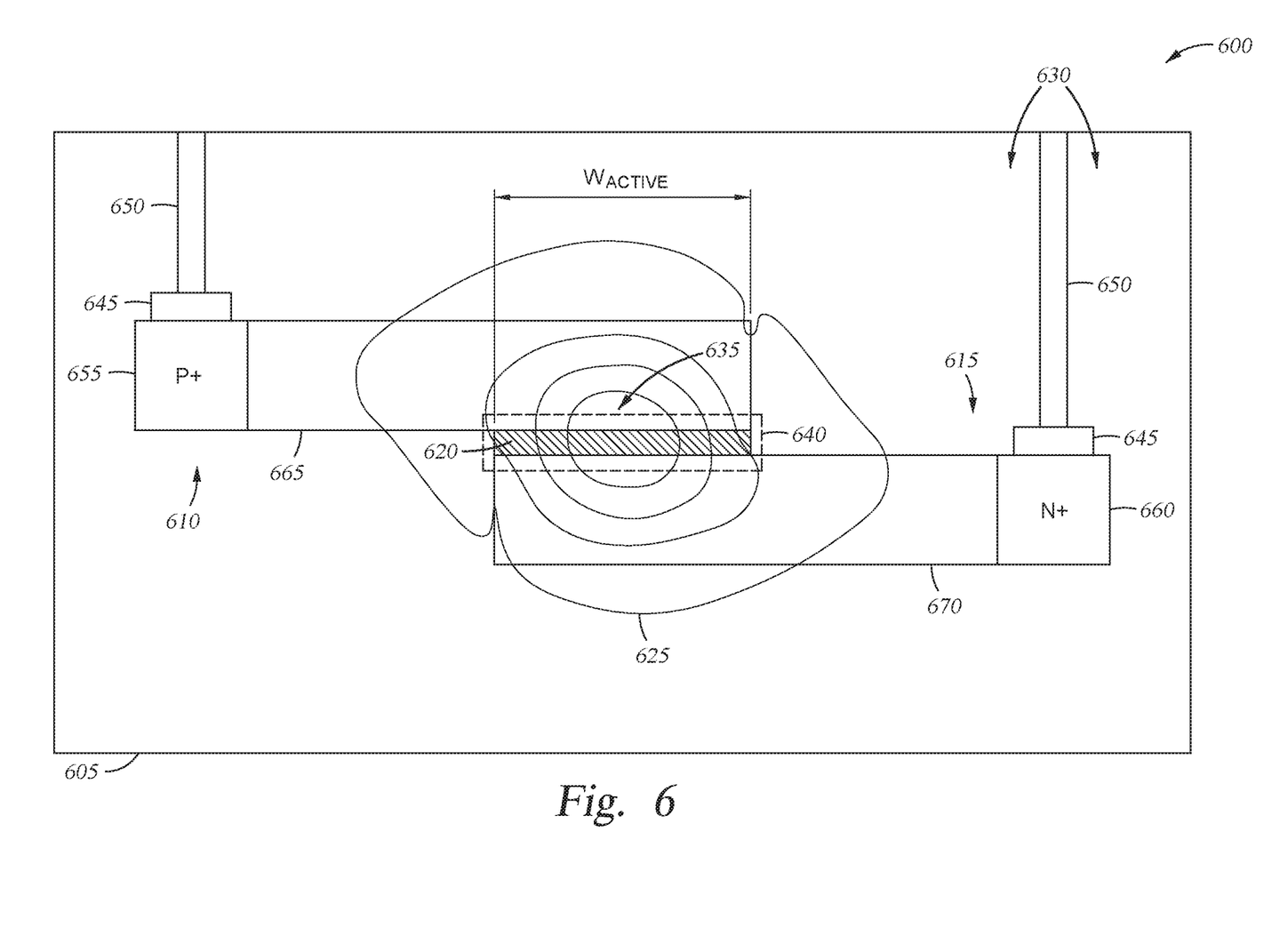
FIG. 6 is a diagram of an exemplary silicon-insulator-silicon capacitive (SISCAP) implementation of an electro-optic phase shifter, according to one or more embodiments.

FIG. 6 is a diagram of an exemplary silicon-insulator-silicon capacitive (SISCAP) implementation of an electro-optic phase shifter 600, according to one or more embodiments. More specifically, FIG. 6 represents a cross-sectional view of the EO phase shifter 600 in which an optical signal propagates in a direction projecting into, or out of, the page.

The EO phase shifter 600 comprises a surface layer 605, which may be arranged above a buried insulation layer (or buried oxide (BOX) layer) and/or a semiconductor substrate (not depicted). In some embodiments, the surface layer 605 and/or the substrate may include silicon or other semiconductor materials or optically transmissive materials. Moreover, the surface layer 605 and the substrate may be made of the same material, but in other embodiments may be made from different materials.

The thickness of the surface layer 605 may range from less than 100 nanometers to greater than a micron. More specifically, the surface layer 605 may be between 100-300 nanometers thick. The thickness of the insulation layer may vary depending on the desired application, e.g., based on the size of the mode being coupled to the EO phase shifter 600 and the desired efficiency. As such, the thickness of insulation layer may range from less than one micron to tens of microns. The thickness of the substrate may vary widely depending on the specific application of the EO phase shifter 600. For example, the substrate may be the thickness of a typical semiconductor wafer (e.g., 100-700 microns) or may be thinned and mounted on another substrate.

For optical applications, the surface layer 605 and insulation layer (e.g., silicon dioxide, silicon nitride, and the like) may provide contrasting refractive indexes that vertically confine an optical signal in a waveguide in the surface layer 605. In a later processing step, the surface layer 605 of the EO phase shifter 600 may be etched to form one or more silicon waveguides. Because silicon has a high refractive index compared to an insulator such as silicon dioxide, the optical signal remains primarily in the waveguide as it propagates across the surface layer 605.

The EO phase shifter 600 may include an upper silicon region 610 doped with a first conductivity type (e.g., P-type) that is spaced apart from a lower silicon region 615 doped with a second, different conductivity type (e.g., N-type) by a gate dielectric layer 620. The arrangement of the upper silicon region 610, gate dielectric layer 620, and lower silicon region 615 forms a SISCAP guide that provides efficient, high-speed optical modulation of an optical signal passing through the EO phase shifter 600.

FIG. 6 illustrates the confinement of the optical mode 625 of the optical signal by the insulation layer and by the dielectric material 630 (e.g., silicon dioxide or silicon nitride) surrounding the upper silicon region 610 and the lower silicon region 615. Moreover, the thicknesses and widths of the upper silicon region 610 and the lower silicon region 615 may be selected in order to aid the confinement of the optical mode 625. For example, the intensity of the optical mode 625 may generally increase when approaching a center 635 of the optical mode. Through selecting properties of the upper silicon region 610 and the lower silicon region 615, the more intense portions of the optical mode 625 may be shaped or better confined to allow more efficient modulation of the optical signal.

The gate dielectric layer 620 establishes a charge modulation region (or charge accumulation region) 640 shown by the dashed box in which free carriers (e.g., electrons and holes) flow into and out of the upper silicon region 610 and the lower silicon region 615. Doing so creates an active region (defined by $W_{active}$) where the switching function associated with the EO phase shifter 600 (e.g., at switching speeds of 1 Gb/s or greater, such as 10 Gb/s, 28 Gb/s, 40 Gb/s, etc.) can be controlled by a voltage potential applied across the gate dielectric layer 620. In one embodiment, the voltage potential is used to alter the phase of the optical signal propagating through the EO phase shifter 600, as in, for example, a Mach-Zehnder interferometer (MZI). However, the EO phase shifter 600 described herein may also be used in other types of devices such as ring resonators, Fabry-Perot cavities, etc.

The gate dielectric layer 620 may be referred to as either "gate dielectric" or "gate oxide," where it is to be understood that an oxide is only an exemplary form of a dielectric that may be used in the modulator device. The gate dielectric layer 620 may comprise any material that allows for fast charging/discharging of the free carriers (e.g., enables switching speeds of 1 Gb/s or greater). A non-limiting list of suitable materials include hafnium oxide, oxynitride, bismuth oxide, silicon nitride, silicon oxide, and combinations of these materials. Furthermore, using high-K dielectric materials as the gate dielectric provide higher capacitance and greater charge densities over using dielectrics with lower dielectric constants (assuming same thickness and voltage potential). For example, hafnium oxide and silicon nitride (high-K dielectrics) have higher dielectric constants than silicon dioxide, and thus, enable greater charge densities across the gate dielectric layer relative to using silicon dioxide. Using the higher voltages may increase the modulation efficiency—i.e., the amount the optical signal is phase shifted relative to the amount of voltage applied.

Although the Figures described herein illustrate placing a gate dielectric layer 620 between oppositely doped waveguides, this is not a requirement. For all the embodiments described herein, the modulators may still perform optical modulation if the gate dielectric layer 620 is omitted and the two waveguides directly contact to form a p-n junction. In this example, the p-n junction establishes the charge modulation region 640 where the free carriers flow into and out of the waveguides. However, including the gate dielectric layer 620 may improve the efficiency of the optical modulation.

As shown, the upper silicon region 610 is doped P-type while the lower silicon region 615 is doped N-type. However, for all the embodiments where the dopant type is specified, the dopant types may be reversed—e.g., the upper silicon region 610 may be doped N-type while the lower silicon region 615 is P-type. Furthermore, the upper silicon region 610 and the lower silicon region 615, which serve as electrodes for the capacitive structure of the EO phase shifter 600, may be silicon based. For example, the material of the regions 105, 110 may include strained silicon, $Si_xGe_{1-x}$, substantially single-crystal silicon (i.e., crystalline silicon), polycrystalline silicon, amorphous silicon, germanium, III-V compounds (such as boron nitride, gallium arsenide, indium arsenide, etc.), as well as combinations thereof. In one embodiment, the lower silicon region 615 may include crystalline silicon while the upper silicon region 610 may be polycrystalline silicon. However, in other embodiments, both the upper silicon region 610 and the lower silicon region 615 may be made from crystalline silicon or polycrystalline silicon.

A width of the upper silicon region 610 and the lower silicon region 615 may be selected to keep electrical contacts 645, which may be metallic or formed from silicide, and vias 650 disposed away from the optical mode 625. Because electrically conductive materials may have a deleterious effect on optical modulation, the upper silicon region 610 and the lower silicon region 615 may be designed such that any conductive contacts are sufficiently outside the boundaries of the optical mode 625. Moreover, as shown in FIG. 6, the portions of the upper silicon region 610 and the lower silicon region 615 that are disposed proximate to the electrical contacts 645 (i.e., the silicon portions 655, 660) are more heavily doped than the portions of the upper silicon region 610 and the lower silicon region 615 in which the optical modulation occurs (i.e., the silicon portions 665, 670). This arrangement may improve the electrical connection between the upper silicon region 610 and the lower silicon region 615 and the electrical contacts 645, thereby decreasing the electrical resistance and related RC time constant associated with the EO phase shifter 600. Moreover, increasingly doped portions of the waveguides disposed proximate to the electrical connection to an external voltage source may be applied to any of the embodiments described herein. Furthermore, the concentration of dopant may increase in the upper silicon region 610 and the lower silicon region 615 as the distance from the optical mode 625 increases. Because the dopant may have a deleterious effect on the optical signal, the dopant concentration in the upper silicon region 610 and the lower silicon region 615 where the optical mode 625 is located may be lightly doped. The dopant concentration may be increased in a step-wise or a substantially continuous manner as the distance from the optical mode 625 increases. Doing so improves the electrical conductivity of the upper silicon region 610 and the lower silicon region 615 and tends to mitigate the negative effect of the dopant on the optical signal. Furthermore, in one embodiment, the electrical contacts 645 may be omitted and the vias 650 directly contact the heavily-doped silicon portions 655, 660.

In one embodiment, the width of the active region $W_{active}$ (i.e. corresponding to the width of the gate dielectric layer 620) is less than a micron, and more specifically, less than half a micron. The thickness of the upper silicon region 610 and the lower silicon region 615 may range between 50-200 nanometers. In one embodiment, to center the greatest intensity of the light in the optical mode 625 in the charge modulation region 640, the respective thicknesses of the upper silicon region 610 and the lower silicon region 615 may be the same. The thickness of the gate dielectric layer 620 may range from 20 nanometers to 1 or 2 nanometers.

While one simple example of the EO phase shifter 600 is illustrated in FIG. 6, other embodiments may include various alternative geometries that provide a desired performance of the EO phase shifter 600. For example, other embodiments may dispose the upper silicon region 610 substantially entirely above the lower silicon region 615 (i.e., in a vertical arrangement). Other embodiments may also include ridge portions on one or more of the upper silicon region 610 and the lower silicon region 615, which may help to further confine the optical mode 625 and improve efficiency of the EO phase shifter 600.

Figure 7:
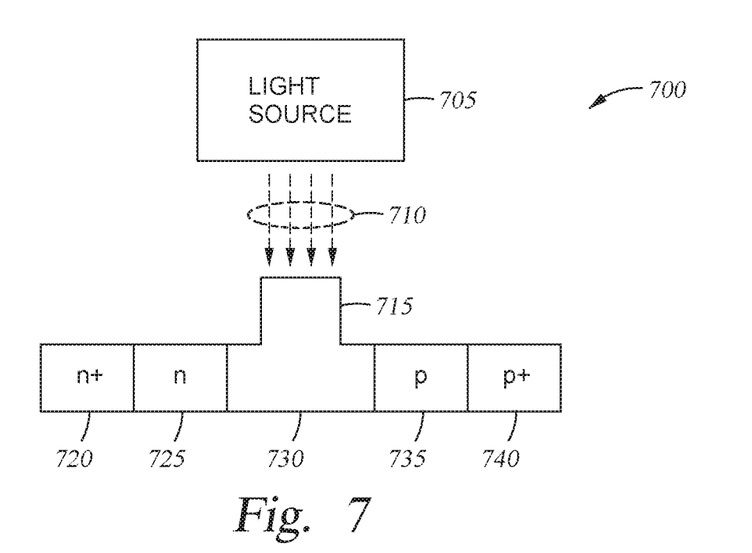
FIG. 7 is a diagram of an exemplary optically-pumped phase shifter, according to one or more embodiments.

FIG. 7 is a diagram of an exemplary optically-pumped phase shifter 700, according to one or more embodiments. More specifically, FIG. 7 represents a cross-sectional view of the optically-pumped phase shifter 700 in which an optical signal propagates in a direction projecting into, or out of, the page.

The optically-pumped phase shifter 700 comprises a reverse-biased p-i-n waveguide arranged relative to a light source 705. The waveguide may have any suitable implementation, such as a silicon-based ridge waveguide or a silicon nitride-loaded slab. As depicted from left to right, the waveguide comprises a heavily-doped (n-type) region 720, a less-heavily doped (n-type) region 725, an insulator region 730, a less-heavily doped (p-type) region 735, and a heavily-doped (p-type) region 740, each of which may comprise silicon or other suitable semiconductor materials. The insulator region 730 is depicted as having a ridge portion 715, which may be beneficial for confining the optical mode of the optical signal.

The light source 705 may have any suitable implementation. In some embodiments, the light source 705 comprises one of a vertical-cavity surface emitting laser (VCSEL) and a light-emitting diode (LED). The light source 705 is configured to emit light 710 toward the waveguide, and more specifically the insulator region 730. The waveguide generates free carriers responsive to the incidence of the light 710, which results in a phase shift for the propagating optical signal.

The voltage gradient applied across the waveguide is configured to sweep away the free carriers. Thus, the carrier lifetime may be controlled by the voltage bias and/or the geometry of the waveguide, and each of these may be adjusted to when compensating for the response time of the TO phase shifter.

Figure 8:
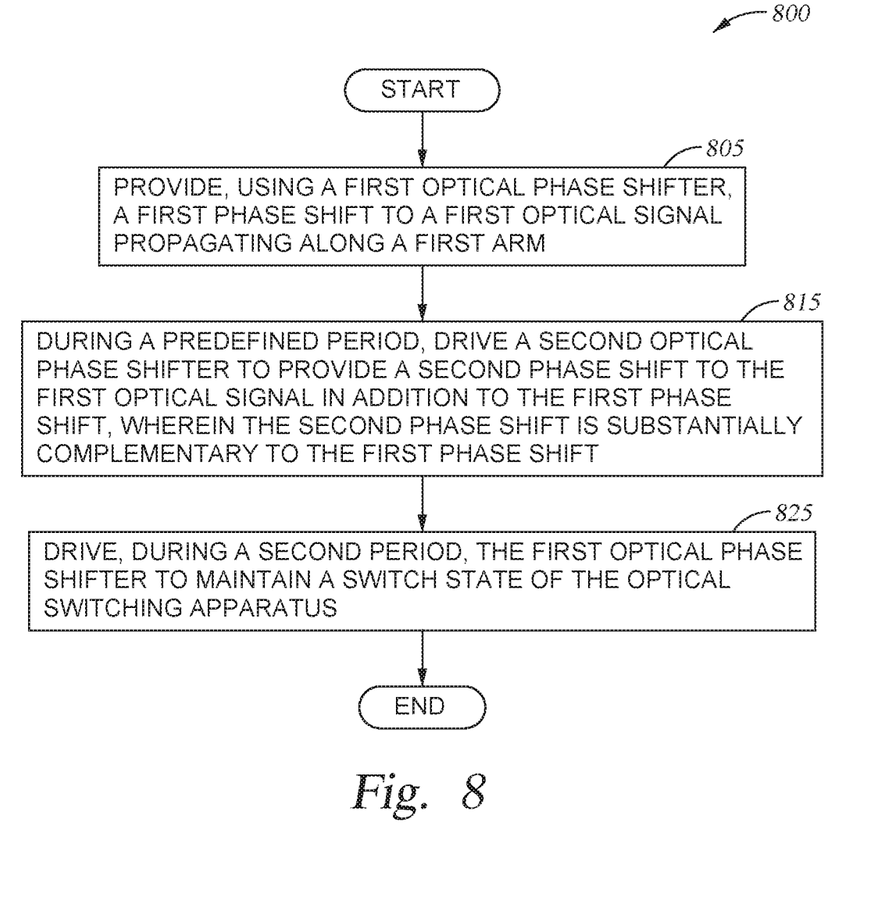
FIG. 8 is an exemplary method that is suitable for use with a complementary optical phase shifting arrangement, according to one or more embodiments.

FIG. 8 is an exemplary method 800 that is suitable for use with a complementary optical phase shifting arrangement, according to one or more embodiments. The method 800 may be used in conjunction with other embodiments, such as the optical phase shifting arrangement 100 of FIG. 1 and the driving scheme depicted in diagram 200 of FIG. 2.

The method 800 begins at block 805, where the optical phase shifting arrangement provides, using a first optical phase shifter, a first phase shift to a first optical signal propagating along a first arm. In some embodiments, a phase controller drives the first optical phase shifter with control signals to provide the first phase shift.

At block 815, during a predefined period, a phase controller drives a second optical phase shifter to provide a second phase shift to the first optical signal in addition to the first phase shift. The second phase shift is substantially complementary to the first phase shift. In some embodiments, the predefined period may correspond to a predefined switching period of an associated optical switching device. In some embodiments, the first optical phase shifter comprises a TO phase shifter, and the second optical phase shifter comprises an EO phase shifter or an optically-pumped phase shifter.

At block 825, the phase controller drives, during a second period, the first optical phase shifter to maintain a switch state of the optical switching device. The second period may correspond to a non-switching period. Method 800 ends following completion of block 825.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical phase shifting arrangement comprising:
a first optical phase shifter configured to provide a first phase shift to an optical signal;
a second optical phase shifter configured to provide a second phase shift to the optical signal in addition to the first phase shift; and
a phase controller configured to, during a predefined period:

determine a phase shift value for a total phase shift to be provided to the optical signal, wherein the total phase shift is a sum of the first phase shift and the second phase shift;

drive the first optical phase shifter with a first signal to cause the first optical phase shifter to provide the phase shift value upon elapse of a rise time of the first optical phase shifter; and drive the second optical phase shifter with a second signal to cause the total phase shift to reach the phase shift value before the elapse of the rise time.

2. The optical phase shifting arrangement of claim 1, wherein the first optical phase shifter comprises a thermo-optic (TO) phase shifter, and wherein the second phase shifter comprises an electro-optic (EO) phase shifter.

3. The optical phase shifting arrangement of claim 2, wherein the EO phase shifter comprises one of a silicon-insulator-silicon capacitive (SISCAP) modulator, a p-n junction modulator, and a p-i-n junction modulator.

4. The optical phase shifting arrangement of claim 1, wherein the first optical phase shifter comprises a thermo-optic (TO) phase shifter, and wherein the second phase shifter comprises an optically-pumped phase shifter.

5. The optical phase shifting arrangement of claim 1, wherein during the predefined period:
the first signal is a square edge signal; and
the second signal is an impulse signal having a decay selected to compensate the rise time of the first optical phase shifter.

6. The optical phase shifting arrangement of claim 1, wherein the optical signal propagates along a first arm, the optical phase shifting arrangement further comprising:
a ring resonator comprising a waveguide disposed proximate to the first arm,
wherein the first optical phase shifter and the second optical phase shifter are arranged proximate to the waveguide.

7. The optical shifting arrangement of claim 6, wherein the waveguide is also arranged proximate to a second arm configured to propagate a second optical signal.

8. An optical switching device comprising:
a first arm configured to propagate a first optical signal;
a first optical phase shifter arranged proximate to the first arm, the first optical phase shifter configured to provide a first phase shift to the first optical signal;
a second optical phase shifter arranged proximate to the first arm, the second optical phase shifter configured to provide a second phase shift to the first optical signal in addition to the first phase shift; and
a phase controller configured to, during a switching period:
determine a phase shift value for a total phase shift to be provided to the first optical signal, wherein the total phase shift is a sum of the first phase shift and the second phase shift;
drive the first optical phase shifter with a first signal to cause the first optical phase shifter to provide the phase shift value upon elapse of a rise time of the first optical phase shifter; and
drive the second optical phase shifter with a second signal to cause the total phase shift to reach the phase shift value before the elapse of the rise time.

9. The optical switching device of claim 8, wherein the first optical phase shifter comprises a thermo-optic (TO) phase shifter, and wherein the second phase shifter comprises an electro-optic (EO) phase shifter.

10. The optical switching device of claim 9, wherein the EO phase shifter comprises one of a silicon-insulator-silicon capacitive (SISCAP) modulator, a p-n junction modulator, and a p-i-n junction modulator.

11. The optical switching device of claim 8, wherein the first optical phase shifter comprises a thermo-optic (TO) phase shifter, and wherein the second phase shifter comprises an optically-pumped phase shifter.

12. The optical switching device of claim 8, wherein during the switching period:
the first signal is a square edge signal; and
the second signal is an impulse signal having a decay selected to compensate the rise time of the first optical phase shifter.

13. The optical switching device of claim 8, further comprising:
a ring resonator comprising a waveguide disposed proximate to the first arm,
wherein the first optical phase shifter and the second optical phase shifter are arranged proximate to the waveguide.

14. The optical switching device of claim 13, further comprising:
a second arm configured to propagate a second optical signal, wherein the waveguide is also arranged proximate to the second arm.

15. The optical switching device of claim 8, further comprising:
a second arm configured to propagate a second optical signal;
an input optical coupler configured to, using a plurality of input optical signals, provide the first optical signal to the first arm and provide the second optical signal to the second arm;
a third optical phase shifter and a fourth optical phase shifter arranged along the second arm and configured to provide substantially complementary phase shifts to the second optical signal during a corresponding predefined period; and
an output optical coupler configured to, using the first optical signal and the second optical signal, provide a plurality of output optical signals.

16. A method comprising:
determining a phase shift value for a total phase shift to be provided to a first optical signal propagating along a first arm, wherein the total phase shift is a sum of a first phase shift provided by a first optical phase shifter and a second phase shift provided by a second optical phase shifter;
driving, during a predefined period, the first optical phase shifter with a first signal to cause the first optical phase shifter to provide the phase shift value upon elapse of a rise time of the first optical phase shifter; and
driving, during the predefined period, the second optical phase shifter with a second signal to cause the total phase shift to reach the phase shift value before the elapse of the rise time.

17. The method of claim 16, wherein the first optical phase shifter comprises a thermo-optic (TO) phase shifter, and wherein the second optical phase shifter comprises one of an electro-optic (EO) phase shifter and an optically-pumped phase shifter.

18. The method of claim 16, wherein during the predefined period:
the first signal is a square edge signal; and
the second signal is an impulse signal having a decay selected to compensate the rise time.

19. The method of claim 16, wherein the first optical phase shifter and the second optical phase shifter are included in an optical switching device, and wherein the predefined period comprises a switching period of the optical switching device, the method further comprising:
  driving, during a non-switching period, the first optical phase shifter to maintain a switch state of the optical switching device.

20. The optical phase shifting arrangement of claim 1,
  wherein the second optical phase shifter has a second rise time that is shorter than the first rise time, and
  wherein, during the predefined period, the phase shift value is reached upon elapse of the second rise time.

\* \* \* \* \*